(12) United States Patent
Tseng et al.

(10) Patent No.: US 10,703,030 B1
(45) Date of Patent: *Jul. 7, 2020

(54) MOLDING SYSTEM FOR PREPARING FIBERLESS THERMOPLASTIC COMPOSITE ARTICLE

(71) Applicant: CORETECH SYSTEM CO., LTD., Chupei, Hsinchu County (TW)

(72) Inventors: Huan-Chang Tseng, Chupei (TW); Rong-Yeu Chang, Chupei (TW); Chia-Hsiang Hsu, Chupei (TW)

(73) Assignee: CORETECH SYSTEM CO., LTD., Chupei, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,115

(22) Filed: Nov. 22, 2019

Related U.S. Application Data

(60) Provisional application No. 62/899,320, filed on Sep. 12, 2019.

(51) Int. Cl.
*B29C 45/00* (2006.01)
*B29C 45/76* (2006.01)
(Continued)

(52) U.S. Cl.
CPC ...... *B29C 45/0046* (2013.01); *B29C 45/0001* (2013.01); *B29C 45/03* (2013.01);
(Continued)

(58) Field of Classification Search
CPC ..... B29C 45/0046; B29C 45/03; B29C 45/76; B29C 45/0001; B29K 2995/0044; B29K 2069/00
See application file for complete search history.

(56) References Cited

U.S. PATENT DOCUMENTS 9,283,695 B1 * 3/2016 Tseng ................. B29C 45/7693
9,573,307 B1 * 2/2017 Tseng ................. B29C 45/7693
(Continued)

OTHER PUBLICATIONS

Costa, F.S., H. Yokoi, Y. Murata, and P.K. Kennedy, "Numerical Simulation of Ear-Flow: The Faster Advance of the Flow Front at the Edge of a Cavity," Polymer Processing Society (PPS) 22th, Yamagata, Japan (2006); pp. 1-2.
(Continued)

*Primary Examiner* — Nahida Sultana
(74) *Attorney, Agent, or Firm* — Muncy, Geissler, Olds & Lowe, P.C.

(57) ABSTRACT

The present disclosure provides a molding system for preparing an injection-molded fiberless plastic article. The molding system includes a molding machine; a mold disposed on the molding machine; a processing module configured to generate an anisotropic viscosity distribution of the fiberless molding resin in the mold cavity; and a controller coupled to the processing module. The mold has a mold cavity for being filled with a fiberless molding resin including a plurality of polymer chains. The processing module is configured to generate the anisotropic viscosity distribution based on a molding condition for the molding machine and based in part on consideration of an orientation effect of the plurality of polymer chains. The controller is configured to control the molding machine with the molding condition using the generated anisotropic viscosity distribution of the fiberless molding resin to perform an actual molding process for preparing the injection-molded fiberless plastic article.

10 Claims, 6 Drawing Sheets

(51) Int. Cl.
 *B29C 45/03* (2006.01)
 *B29K 69/00* (2006.01)
(52) U.S. Cl.
 CPC .......... *B29C 45/76* (2013.01); *B29K 2069/00* (2013.01); *B29K 2995/0044* (2013.01)

(56) References Cited

U.S. PATENT DOCUMENTS

| | | | |
|---|---|---|---|
| 10,201,918 B1* | 2/2019 | Favaloro | B29C 43/003 |
| 10,201,921 B1* | 2/2019 | Tseng | B29C 45/77 |
| 10,377,066 B1* | 8/2019 | Tseng | B29C 45/0005 |
| 10,427,344 B1* | 10/2019 | Tseng | G06F 30/20 |
| 2017/0001336 A1* | 1/2017 | Tamai | B29B 9/12 |
| 2019/0232535 A1* | 8/2019 | Tseng | B29C 45/0005 |

OTHER PUBLICATIONS

Bakharev, A., D. Astbury, S. Ray, F.S. Costa, and R. Speight, "Effect of Normal Stresses on the Results of Thermoplastic Mold Filling Simulation," International Conference on Numerical Methods in Industrial Forming, 80, 16004 (2016); pp. 1-6.

Tseng, H.-C. and A.J. Favaloro, "The Use of Informed Isotropic Constitutive Equation to Simulate Anisotropic Rheological Behaviors in Fiber Suspensions." J Rheol 63 263; Jan. 31, 2019 ; pp. 263-274.

"Shear-Induced Flow Imbalance and Meltflipper® Effects in Autodesk® Moldflow® Injection Molding Simulation", WWW Document, https://www.autodesk.com/autodesk-university/class/Shear-Induced-Flow-Imbalance-and-MeltFlipperR-Effects-AutodeskR-MoldflowR-Injection-Molding; Nov. 28, 2011; pp. 1-25.

Favaloro, A.J., H.-C. Tseng, and R.B. Pipes, "A New Anisotropic Viscous Constitutive Model for Composites Molding Simulation." Composites Part A: Applied Science and Manufacturing 115 (2018); pp. 112-122.

Takeshima, M. and N. Funakoshi, "Molecular Orientation Distribution in Injection-Molded Polycarbonate Discs." Journal of Applied Polymer Science, vol. 32, (1986); pp. 3457-3468.

Cross, M.M., "Relation between Viscoelasticity and Shear-Thinning Behaviour in Liquids." Rheol Acta 18; Mar. 20, 1979; pp. 609-614.

Rong-Yeu Chang and Wen-hsien Yang, "Numerical simulation of mold filling in injection molding using a three-dimensional finite volume approach," International Journal for Numerical Methods in Fluids vol. 37, Issue 2, Sep. 30, 2001; pp. 125-148.

\* cited by examiner

MOLDING SYSTEM FOR PREPARING FIBERLESS THERMOPLASTIC COMPOSITE ARTICLE

TECHNICAL FIELD

The present disclosure relates to a molding system for preparing an injection-molded fiberless plastic article, and more particularly, to an injection-molding system for preparing an injection-molded fiberless plastic article using a computer-aided engineering (CAE) simulation.

DISCUSSION OF THE BACKGROUND

There is a long-running problem requiring an urgent solution for the industry: to date, prior state-of-the-art predictive engineering tools (See, for example, Costa, F. S., H. Yokoi, Y. Murata, and P. K. Kennedy, "Numerical Simulation of Ear-Flow: The Faster Advance of the Flow Front at the Edge of a Cavity," *Polymer Processing Society (PPS) 22th*, Yamagata, Japan (2006) and Bakharev, A., D. Astbury, S. Ray, F. S. Costa, and R. Speight, "Effect of Normal Stresses on the Results of Thermnnoplastic Mold Filling Simulation," *International Conference on Numerical Methods in Industrial Forming*, 80, 16004 (2016); the entirety of the above-mentioned publications is hereby incorporated by reference herein and made a part of this specification) have always provided unsatisfactory results, particularly regarding the so-called "ear flow" in which the advance of the flow front in the center of the cavity is obviously slower than at the edges. The IISO (informed isotropic) viscosity model can simulate an ear flow for fiber composites with skin-shear-core structure of fiber orientation (See, for example, Tseng, H.-C. and A. J. Favaloro, "The Use of Informed Isotropic Constitutive Equation to Simulate Anisotropic Rheological Behaviors in Fiber Suspensions." J Rheol 63 263 (2019); the entirety of the above-mentioned publication is hereby incorporated by reference herein and made a part of this specification). Because the injection-molded polycarbonate (PC) discs exhibit the same structure of molecular orientation, the present invention proposes that the IISO viscosity model for fiber-reinforced composites with fiber orientation should be extended to simulate the ear flow induced by molecular orientation for neat polymers.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

The present disclosure provides a molding system for preparing an injection-molded fiberless plastic article, comprising: a molding machine; a mold disposed on the molding machine and having a mold cavity for being filled with a fiberless molding resin including a plurality of polymer chains; a processing module configured to generate an anisotropic viscosity distribution of the fiberless molding resin in the mold cavity based on a molding condition for the molding machine, wherein the anisotropic viscosity distribution of the fiberless molding resin is generated based in part on consideration of an orientation effect of the plurality of polymer chains; and a controller coupled to the processing module and configured to control the molding machine with the molding condition using the generated anisotropic viscosity distribution of the fiberless molding resin to perform an actual molding process for preparing the injection-molded fiberless plastic article.

In some embodiments, the orientation effect of the plurality of polymer chains is represented by an expression:

$$R_{TR} = \frac{\eta_E}{\eta_S} = \frac{R_{T0}}{1 + \left(\frac{\dot{\gamma}}{\dot{\gamma}_c}\right)^2}$$

where $\eta_e(\dot{\gamma})$ represents the elongational viscosity of the fiberless molding resin, $\eta_S(\dot{\gamma})$ represents the shear viscosity of the fiberless molding resin, $R_{T0}$ represents a constant, $\dot{\gamma}_c$ represents a critical strain rate, and Y represents a strain rate of the fiberless molding resin.

In some embodiments, the processing module is further configured to generate an anisotropic stress distribution of the fiberless molding resin based in part on consideration of the generated anisotropic viscosity distribution of the fiberless molding resin.

In some embodiments, the anisotropic stress distribution of the fiberless molding resin is represented using an expression:

$$\tau = 2\eta^{IISO} D$$

$$\eta^{IISO} = \eta_S \left[ 1 + (R_{TR} - 3) \frac{\dot{\gamma}_f^2}{\dot{\gamma}^2} \right]$$

$$\frac{\dot{\gamma}_f^2}{\dot{\gamma}^2} = \frac{D:A_4:D}{2D:D}$$

where $\tau$ represents a stress tensor, $\eta^{IISO}$ represents an informed isotropic viscosity, D represents a rate of deformation of the fiberless molding resin, $A_4$ represents an orientation distribution of the plurality of polymer chains, $\dot{\gamma}_f$ represents a micro strain rate due to an orientation effect of the fiberless molding resin, and $\dot{\gamma}$ represents a strain rate of the fiberless molding resin.

In some embodiments, the fiberless molding resin includes polycarbonate resin.

In some embodiments, the processing module is further configured to generate the anisotropic stress distribution of the composite molding material based in part on consideration of an anisotropic rotational diffusion effect of the plurality of polymer chains.

In some embodiments, the rotational diffusion effect of the plurality of polymer chains is represented by an expression:

$$D_R = D:A_4:D$$

where $D_R$ represents the anisotropic rotational diffusion effect of the plurality of polymer chains, D represents a rate of deformation of the molding material, and $A_4$ represents an orientation distribution of the plurality of polymer chains.

In some embodiments, the processing module is further configured to generate the anisotropic stress distribution of the composite molding material based in part on consideration of an anisotropic degree of the plurality of polymer chains.

In some embodiments, the anisotropic degree of the plurality of polymer chains is represented by a ratio of a shear rate of the polymer chains to a shear rate of the fiberless molding resin.

In some embodiments, the anisotropic degree of the plurality of polymer chains is represented by an expression:

$$\frac{\dot{\gamma}_f^2}{\dot{\gamma}^2} = \frac{D:A_4:D}{2D:D}$$

where $\dot{\gamma}_f$ represents a micro strain rate due to an orientation effect of the fiberless molding resin, $\dot{\gamma}$ represents a strain rate of the fiberless molding resin, D represents a rate of deformation of the fiberless molding resin, and $A_4$ represents an orientation distribution of the plurality of polymer chains.

In some embodiments, the processing module is configured to generate the anisotropic stress distribution of the fiberless molding resin based on an expression:

$$\tau' = 2\eta'D + 2\eta'N_P(\dot{\gamma})\left(\frac{D:A_4:D}{D:D}\right)D$$

where τ' represents the anisotropic stress distribution of the molding material, η' represents a shear viscosity distribution of the fiberless molding resin, D represents a rate of deformation of the molding material, $N_P(\dot{\gamma})$ represents the integral effect, and $A_4$ represents an orientation distribution of the polymer chains.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

Figure 1:
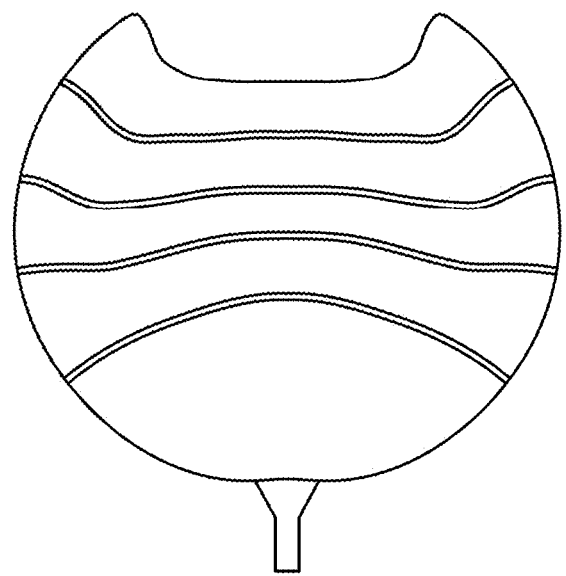
FIG. 1 shows the well-known experimental observation of ear flow for polycarbonate (PC) melt in an injection-molded disk with pin gate.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting to the present inventive concept. As used herein, the singular forms "a," "an" and "the" are intended to include the plural forms as well, unless the context clearly indicates otherwise. It shall be understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

Injection molding is a technology commonly used for high-volume manufacturing of parts made of synthetic resin, most commonly made of thermoplastic polymers. During a repetitive injection-molding process, a plastic resin, most often in the form of small beads or pellets, is introduced into an injection-molding machine that melts the resin beads under heat, pressure, and shear. The now-molten resin is forcefully injected into a mold cavity having a particular cavity shape. The injected plastic is held under pressure in the mold cavity, cooled, and then removed as a solidified part having a shape that essentially duplicates the cavity shape of the mold.

A typical injection-molding procedure comprises four basic operations: (1) heating the plastic resin in the injection-molding machine to allow it to flow under pressure; (2) injecting the melted plastic resin into a mold cavity or cavities defined between two mold halves that have been closed; (3) allowing the plastic resin to cool and harden in the cavity or cavities while under pressure; and (4) opening the mold halves to cause the cooled part to be ejected from the mold. In the conventional injection molding of synthetic resin by an injection-molding machine, the weight of the injected synthetic resin varies with the molten resin pressure, the molten resin specific volume, the molten resin temperature and other molten resin conditions. Therefore, it is difficult to form products of a consistent quality.

In general, the setting of molding conditions of the injection-molding machine requires a large number of trial molding operations and a lengthy setting time because the setting work largely depends on the know-how and experience of an operator of the injection-molding machine, and various physical values affect one another as well.

Therefore, a virtual molding, i.e., a computer-implemented simulation, using CAE (computer-assisted engineering) is performed for the injection molding, and the molding conditions are then set based on the virtual molding. In virtual molding using CAE, phenomena occur in a mold cavity within a short period of time, and therefore the results of simulation of resin temperature, pressure, shear rate, etc. can be reflected in molded products. Therefore, if the molding phenomena occurring within a mold cavity can be accurately predicted, use of CAE may enable optimization of molding conditions and stable molding of non-defective products.

In plastics manufacturing, the actual flow of polymer melts is transient, non-Newtonian and non-isothermal, with frozen layers building up as the complex mixture flows through the mold cavity. A real product consists of many complex geometric features, such as various changes in the direction of the flow, the inclusion of ribs, and changes in thickness and holes. To control the quality of the products, a deep understanding of complicated flow fields is critical. Nowadays, the CAE software provides realistic simulation and predictive analysis for complex flows of complex fluids.

According to the academic research of fluid mechanics and rheology, the strain rate, which indicates the rate of deformation of a material with respect to time, plays an essential role in the physics of fluids. The strain includes shear and extension deformations. As a rule, both have been separately investigated.

In practice, a complex geometric channel flow is a combination of shear flow and extension flow. For the complex flow, the generalized strain rate, which can be determined with certainty, is widely applied in the CAE tool. Flows in injection molding are dominated by shear flows, but extension flows are encountered, such as the contraction flow at gate and nozzle regions, and the fountain flow of a melt front in the cavity. However, the generalized strain rate is not decomposed to determine the individual rate of shear and extension. To address such a long-running issue, the present invention therefore proposes the principal shear rate and principal extension rate, which are obtained from the generalized strain rate. More importantly, the new quantity is defined to show the degree of variation of shear and extension with respect to geometric features in the flow path. This will allow deeper investigation of complicated flow phenomena related to the details of shear and extension.

Applications of polymers and plastics are found in almost all areas of modern daily life due to their versatility with an economically attractive manufacturing. Injection molding is the most common manufacturing process for producing plastic parts. However, there still remains the major problem, mentioned above, of the unsatisfactory results of predictive engineering tools in simulating ear flow behaviors. FIG. 1 shows the well-known experimental observation of ear flow for a polycarbonate (PC) melt in an injection-molded disk with pin gate performed by Beaumon (See, for example, "Shear-Induced Flow Imbalance and Meltflipper® Effects in Autodesk® Moldflow® Injection Molding Simulation", WWW Document, https://www.autodesk.com/autodesk-university/class/Shear-Induced-F low-Imbalance-and-MeltFlipperR-Effects-AutodeskR-MoldflowR-Injection-Molding (2011); the entirety of the above-mentioned publication is hereby incorporated by reference herein and made a part of this specification). The flow pattern illustrated in FIG. 1 is indicative of what is referred to as an intra-cavity imbalance.

Figure 2:
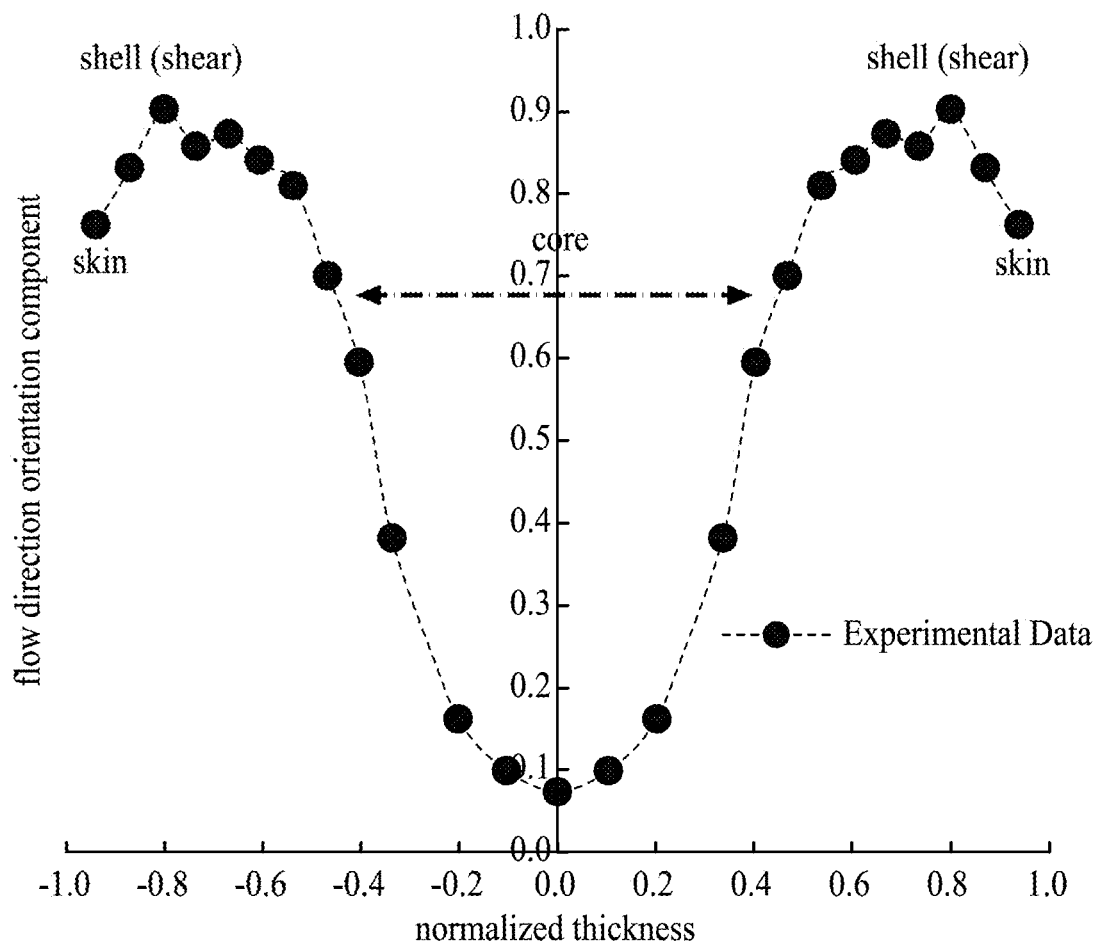
FIG. 2 shows experimental data indicating the flow direction orientation component in relation to normalized thickness across three areas, including skin, shell (or shear) and core structures.

Higher fuel consumption standards are driving the progress and applications of lightweight automotive materials. Among such materials, fiber-reinforced thermnnoplastic (FRT) composites are favored due to excellent strength-to-weight properties. It is important to understand the fiber reinforcement microstructure. FIG. 2 shows experimental flow-direction orientation tensor data of three areas (skin, shell/shear and core) across the thickness of a part, which is significant for injection-molded fiber composites.

Figure 3:
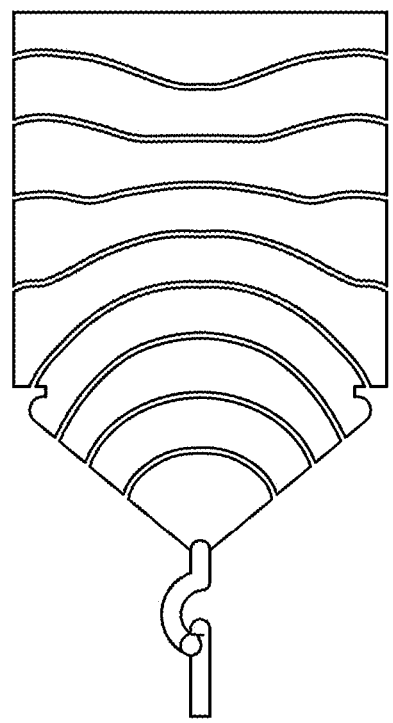
FIG. 3 shows an ear flow simulation for fiber-filled polymer materials.

Typically, the injection-molded melt front of a neat resin has a smooth and continuous shape that is maintained in the propagation of the fi-ee surface. Some peculiar, irregular filling patterns for short/long fiber-reinforced melts at high fiber concentrations are known to occur: the free surface advancing faster along the side walls of the cavity (See, for example, Bakharev, A., D. Astbury, S. Ray, F. S. Costa, and R. Speight, "Effect of Normal Stresses on the Results of Thermoplastic Mold Filling Simulation," *International Conference on Numerical Methods in Industrial Forming*, 80, 16004 (2016); the entirety of the above-mentioned publication is hereby incorporated by reference herein and made a part of this specification). More recently, for fiber-filled polymer materials, the inventors Favaloro et al. and Tseng et al. (See, for example, Favaloro, A. J., H.-C. Tseng, and R. B. Pipes, "A New Anisotropic Viscous Constitutive Model for Composites Molding Simulation." Composites Part A: Applied Science and Manufacturing 115 112-122 (2018); Favaloro, A. J., R. B. Pipes, and H.-C. Tseng, "Molding System for Preparing Fiber-Reinforced Thermoplastic Composite Article," U.S. patent Ser. No. 10/201,918 (2019); Tseng, H.-C., R.-Y. Chang, and C.-H. Hsu, "Molding System for Preparing Fiber-Reinforced Thermoplastic Composite Article," U.S. patent Ser. No. 10/201,921 (2019); Tseng, H.-C. and A. J. Favaloro, "The Use of Informed Isotropic Constitutive Equation to Simulate Anisotropic Rheological Behaviors in Fiber Suspensions." J Rheol 63 263 (2019); the entirety of the above-mentioned publication is hereby incorporated by reference herein and made a part of this specification) have developed the so-called informed isotropic (IISO) viscosity model to simulate anisotropic flow (See, for example, Tseng, H.-C. and A. J. Favaloro, "The Use of Informed Isotropic Constitutive Equation to Simulate Anisotropic Rheological Behaviors in Fiber Suspensions." J Rheol 63 263 (2019); the entirety of the above-mentioned publication is hereby incorporated by reference herein and made a part of this specification), similar for ear flow, as shown in FIG. 3.

Figure 4:
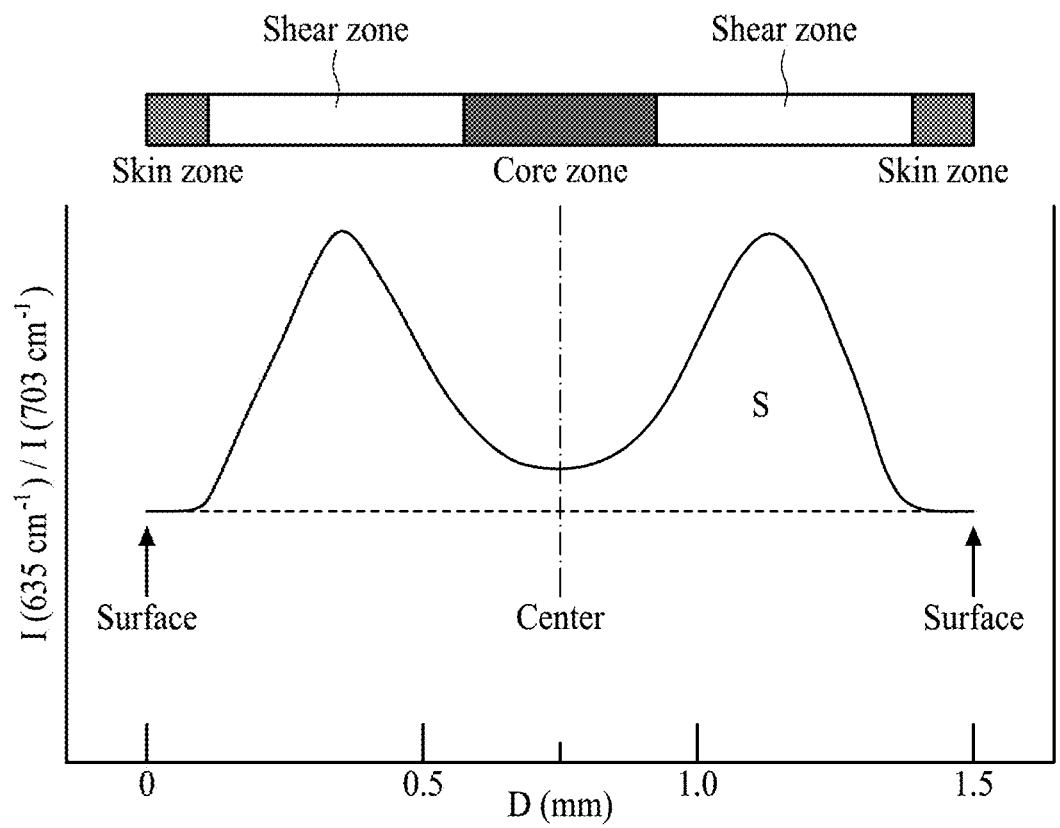
FIG. 4 shows a molecular orientation profile for the injection-molded polycarbonate disc.

From review of literature regarding injection-molded polycarbonate discs, Takeshima and Funakoshi (See, for example, Takeshima, M. and N. Funakoshi, "Molecular Orientation Distribution in Injection-Molded Polycarbonate Discs." Applied Polymers 32 3457-3468 (1986); the entirety of the above-mentioned publication is hereby incorporated by reference herein and made a part of this specification) used laser-Raman spectroscopy to determine the skin-shellcore molecular orientation distribution shown in FIG. 4: a skin zone, which is in contact with the mold, a core zone located at the center, and a shear zone between the skin and the core zones. Molecules in the skin zone are closely random or weak orientation while the orientation of molecules in the core zone is considerably relaxed. The shear zone consists of highly oriented molecules.

The IISO viscosity model can simulate an ear flow for fiber composites with skin-shear-core structure of fiber orientation (See, for example, Tseng, H.-C. and A. J. Favaloro, "The Use of Informed Isotropic Constitutive Equation to Simulate Anisotropic Rheological Behaviors in Fiber Suspensions." J Rheol 63 263 (2019); the entirety of the above-mentioned publication is hereby incorporated by reference herein and made a part of this specification). Because the injection-molded PC discs also exhibit a similar structure of molecular orientation, the present invention proposes that the IISO viscosity model for fiber-reinforced composites with fiber orientation should be extended to simulate the ear flow induced by molecular orientation for neat polymers.

The actual flow of polymer melts is transient, non-Newtonian and non-isothermal, with frozen layers building up as the complex mixture flows through the mold cavity. The governing equations of fluid mechanics, including the equation of continuity, the equation of motion, and the equation of energy to describe the transient and non-isothermal flow motion are as follows:

$$\frac{\partial \rho}{\partial t} + \nabla \cdot \rho u = 0 \tag{1}$$

$$\frac{\partial}{\partial t}(\rho v) + \nabla \cdot (\rho v v) = -\nabla P + \nabla \cdot \tau + \rho g \tag{2}$$

$$\rho C_P \left( \frac{\partial T}{\partial t} + v \cdot \nabla T \right) = \nabla \cdot (k \nabla T) + \eta_S \dot{\gamma}^2 \tag{3}$$

where ρ represents density; u represents the velocity vector; t represents time; τ represents the extra stress tensor; ∇v represents the velocity gradient tensor; g represents the acceleration vector of gravity; P represents pressure; $C_p$ represents specific heat; T represents temperature; k represents thermal conductivity, $\eta_S$ represents shear viscosity, and γ represents the strain rate. The rare-of-deformation tensor D is the symmetric tensor of ∇v:

$$D = \frac{\nabla v + \nabla v^T}{2} \tag{4}$$

The strain rate $\dot{\gamma}$ is the magnitude of the tensor D as an indicator of the rate of deformation of a material with respect to time:

$$\dot{\gamma} = \sqrt{2D:D} \tag{5}$$

The extra stress tensor r is defined by the generalized Newtonian fluid (GNF) model for polymer fluids:

$$\tau = 2\eta_S(T, P, \dot{\gamma}) D \tag{6}$$

In general, the Cross-William-Landel-Ferry (Cross-WLF) flow curve model (See, for example, Cross, M. M., "Relation between Viscoelasticity and Shear-Thinning Behaviour in Liquids." Rheol Acta 18 609-614 (1979); the entirety of the above-mentioned publication is hereby incorporated by reference herein and made a part of this specification) has been used to describe the shear viscosity $\eta_S$ as a function of the temperature T, pressure P, and strain rate $\dot{\gamma}$.

For the anisotropic fiber-filled materials, Favaloro et al. and Tseng et al. (See, for example; Favaloro, A. J., H.-C. Tseng, and R. B. Pipes, "A New Anisotropic Viscous Constitutive Model for Composites Molding Simulation." Composites Part A: Applied Science and Manufacturing 115 112-122 (2018); Favaloro, A. J., R. B. Pipes, and H.-C. Tseng, "Molding System for Preparing Fiber-Reinforced Thermoplastic Composite Article," U.S. patent Ser. No. 10/201,918 (2019); Tseng, H.-C., R.-Y. Chang, and C.-H. Hsu, "Molding System for Preparing Fiber-Reinforced Thermoplastic Composite Article," U.S. patent Ser. No. 10/201,921 (2019); Tseng, H.-C. and A. J. Favaloro, "The Use of Informed Isotropic Constitutive Equation to Simulate Anisotropic Rheological Behaviors in Fiber Suspensions." J Rheol 63 263 (2019); the entirety of the above-mentioned publications is hereby incorporated by reference herein and made a part of this specification) recently developed the informed isotropic (IISO) viscosity scalar $\eta^{IISO}$ in the steady-state stress tensor τ, $$\tau = 2\eta^{IISO} D \tag{7}$$

$$\eta^{IISO} = \eta_S \left[ 1 + (R_{TR} - 1) \frac{\dot{\gamma}_f^2}{\dot{\gamma}^2} \right] \tag{8}$$

$$\frac{\dot{\gamma}_f^2}{\dot{\gamma}^2} = \frac{D:A_4:D}{2D:D} \tag{9}$$

$$R_{TR} = \frac{\eta_E}{\eta_S} = \frac{R_{T0}}{1 + \left( \frac{\dot{\gamma}}{\dot{\gamma}_c} \right)^2} \tag{10}$$

where $A_4$ represents an orientation distribution of the polymer chains. The authors have demonstrated that the IISO viscosity scalar can mitigate the previous numerical convergent issue. Physically, $\dot{\gamma}_f$ represents a micro strain rate due to an orientation effect of the fiberless molding resin, and r represents a strain rate of the fiberless molding resin. In academic rheological research, the parameter $R_T$ is the ratio of the extension viscosity $\eta_e$ to the shear viscosity $\eta_S$, and is referred to as the Trouton ratio.

The IISO viscosity model can simulate an ear flow for fiber composites with skin-shear-core structure of fiber orientation (See, for example, Costa, F. S., H. Yokoi, Y. Murata, and P. K. Kennedy, "Numerical Simulation of Ear-Flow: The Faster Advance of the Flow Front at the Edge of a Cavity," *Polymer Processing Society (PPS) 22th*, Yamagata, Japan (2006) and Bakharev, A., D. Astbury, S. Ray, F. S. Costa, and R. Speight, "Effect of Normal Stresses on the Results of Thermoplastic Mold Filling Simulation," *International Conference on Numerical Methods in Industrial Forming*, 80, 16004 (2016); the entirety of the above-mentioned publications is hereby incorporated by reference herein and made a part of this specification). Because the injection-molded PC discs exhibit the same molecular orientation structure, the present invention proposes that the IISO viscosity model for fiber-reinforced composites with fiber orientation should be extended to simulate the ear flow induced by molecular orientation for neat polymers.

Figure 5:
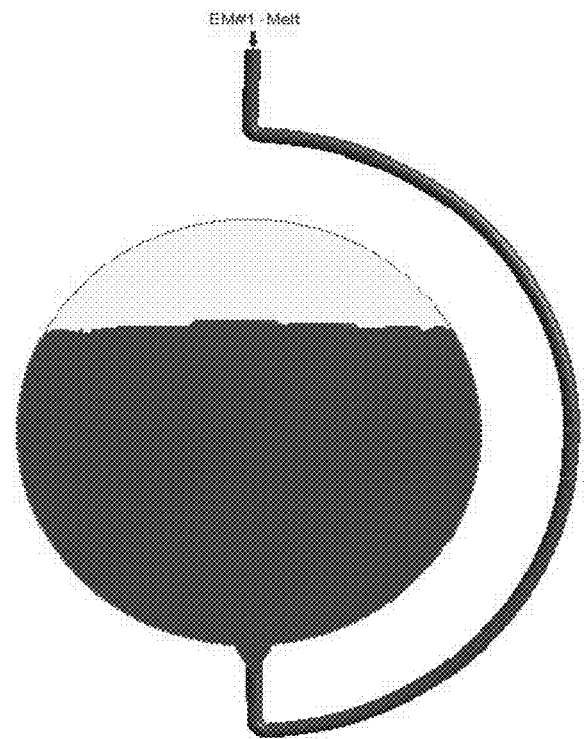
FIG. 5 shows the flat melt front, using the traditional GNF viscosity model.
Figure 6:
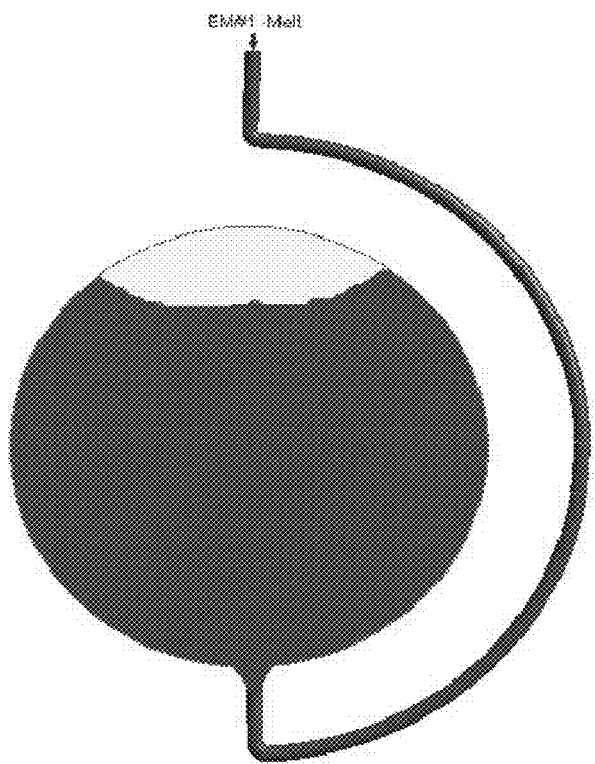
FIG. 6 shows an ear flow with the melt front flowing more slowly at the cavity center than at the edge boundary.

Referring to the work of Beaumon (See, for example, "Shear-Induced Flow Imbalance and Meltflipper® Effects in Autodesk® Moldflow® Injection Molding Simulation", WWW Document, https://www.autodesk.com/autodesk-universitv/class/Shear-Induced-F low-Imbalance-and-Melt-FlipperR-Effects-AutodeskR-MoldflowR-Injection-Molding (2011); the entirety of the above-mentioned publication is hereby incorporated by reference herein and made a part of this specification), a practical injection mold filling simulation of the polycarbonate (PC) fluid for the disk cavity was performed by the commercial injection-molding simulation software, Moldex3D (CoreTech System Co. of Taiwan). The flat melt front based on the traditional GNF viscosity model is shown in FIG. 5 In particular, in relation to adjustment of the IISO model parameter $R_{TR}$, FIG. 6 shows an ear flow in which the melt front at the cavity center is slower than at the edge boundary. Therefore, the molecular-orientation induced ear flow simulations for neat polymers based on the IISO viscosity model provide accurate predictions.

Figure 7:
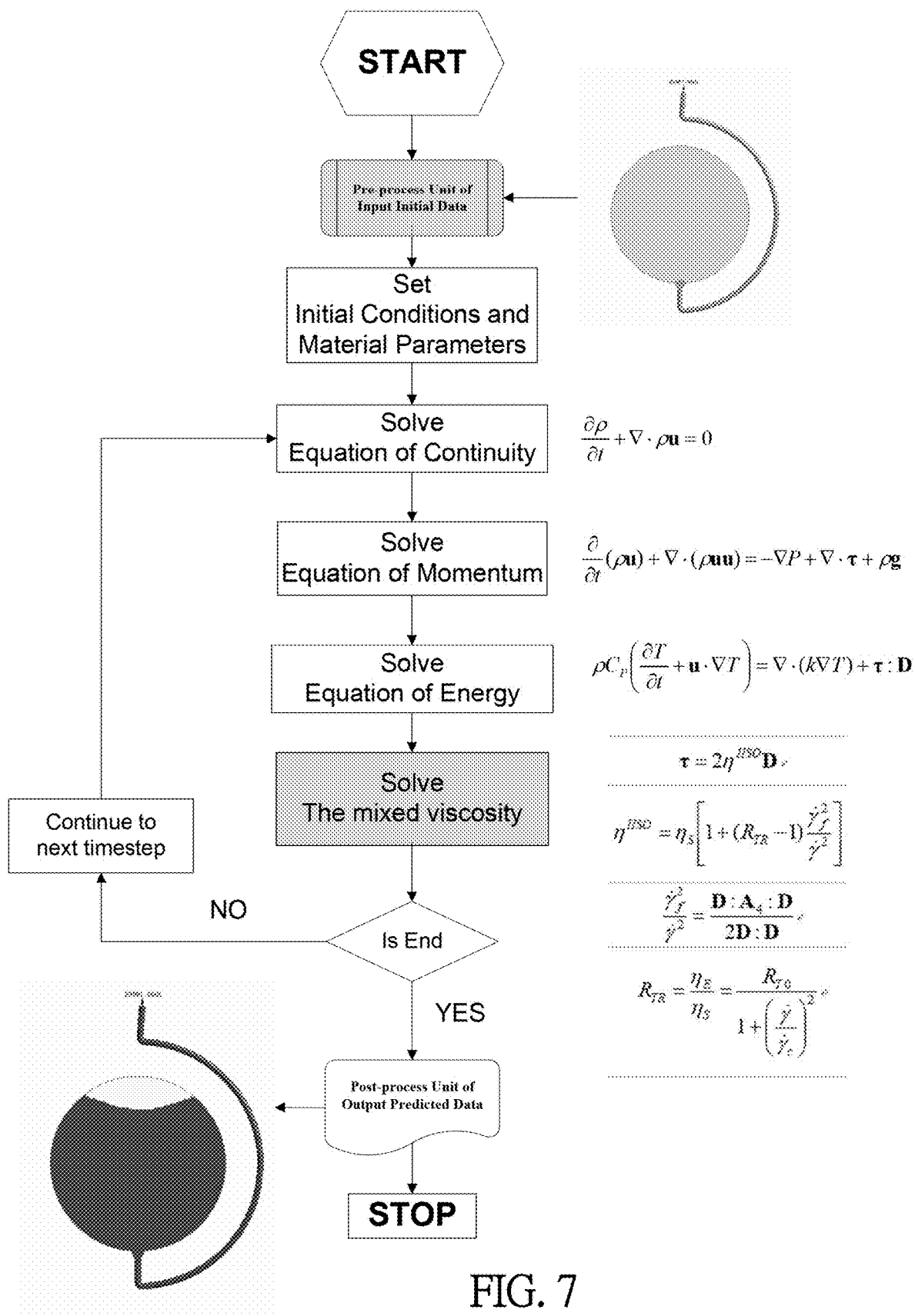
FIG. 7 is a flowchart showing an injection-molding simulation operation in accordance with some embodiments of the present disclosure, using the IISO model for fiberless plastic article.

FIG. 7 is a flowchart showing an injection-molding simulation operation in accordance with some embodiments of the present disclosure. As shown in FIG. 7, the CAE simulation software can calculate the stress tensor τ by applying the modified Lipscomb equation for the subsequent fiber orientation distribution analysis. In addition, after calculating the stress tensor τ, if the numerical calculation results are not convergent, the fiber parameters or the molding conditions may be adjusted, and another simulation can be performed to obtain updated calculation results. By applying the modified Lipscomb equation, the orientation distribution of the fibers can be accurately predicted.

Still referring to FIG. 7, in injection-molding simulation operations, the governing equations of fluid mechanics that describe the transient flow behaviors are as follows:

$$\frac{\partial p}{\partial t} + \nabla \cdot \rho u = 0 \qquad (11)$$

$$\frac{\partial}{\partial t}(\rho u) + \nabla \cdot (\rho u u) = \nabla \cdot \sigma + \rho g \qquad (12)$$

$$\sigma = -PI + \tau \qquad (13)$$

$$\rho C_P \left( \frac{\partial T}{\partial t} + v \cdot \nabla T \right) = \nabla \cdot (k \nabla T) + \eta_S \dot{\gamma}^2 \qquad (14)$$

where ρ represents density; u represents the velocity vector; t represents time; a represents the total stress tensor and r represents the extra stress tensor; ∇v represents the velocity gradient tensor; g represents the acceleration vector of gravity; P represents pressure; $C_p$ represents specific heat; T represents temperature; k represents thermal conductivity, $\eta_S$ represents shear viscosity, and $\dot{\gamma}$ represents the strain rate.

Solving the governing equations (11)-(14) requires a transient state analysis, which can be performed numerically using a computer (See, for example, Rong-Yeu Chang and Wen-hsien Yang, "Numerical simulation of mold filling in injection molding using a three-dimensional finite volume approach," International Journal for Numerical Methods in Fluids Volume 37, Issue 2, pages 125-148, Sep. 30, 2001; the entirety of the above-mentioned publication is hereby incorporated by reference herein and made a part of this specification). During the transient state analysis, the process variables that change with time are not zero; i.e., the partial derivatives $$\left( \frac{\partial}{\partial t} \right)$$

in the governing equations (11)-(14) are not considered zero.

The true 3D Finite Volume Method (FVM) is employed due to its robustness and efficiency to solve the transient flow fields in a complex 3D geometrical article. In some embodiments of the present disclosure, the simulation flow in FIG. 7 can be implemented using a commercial injection-molding simulation software, Moldex3D (CoreTech System Co. of Taiwan), to facilitate the orientation predictions of the fiberless molding resin.

Figure 8:
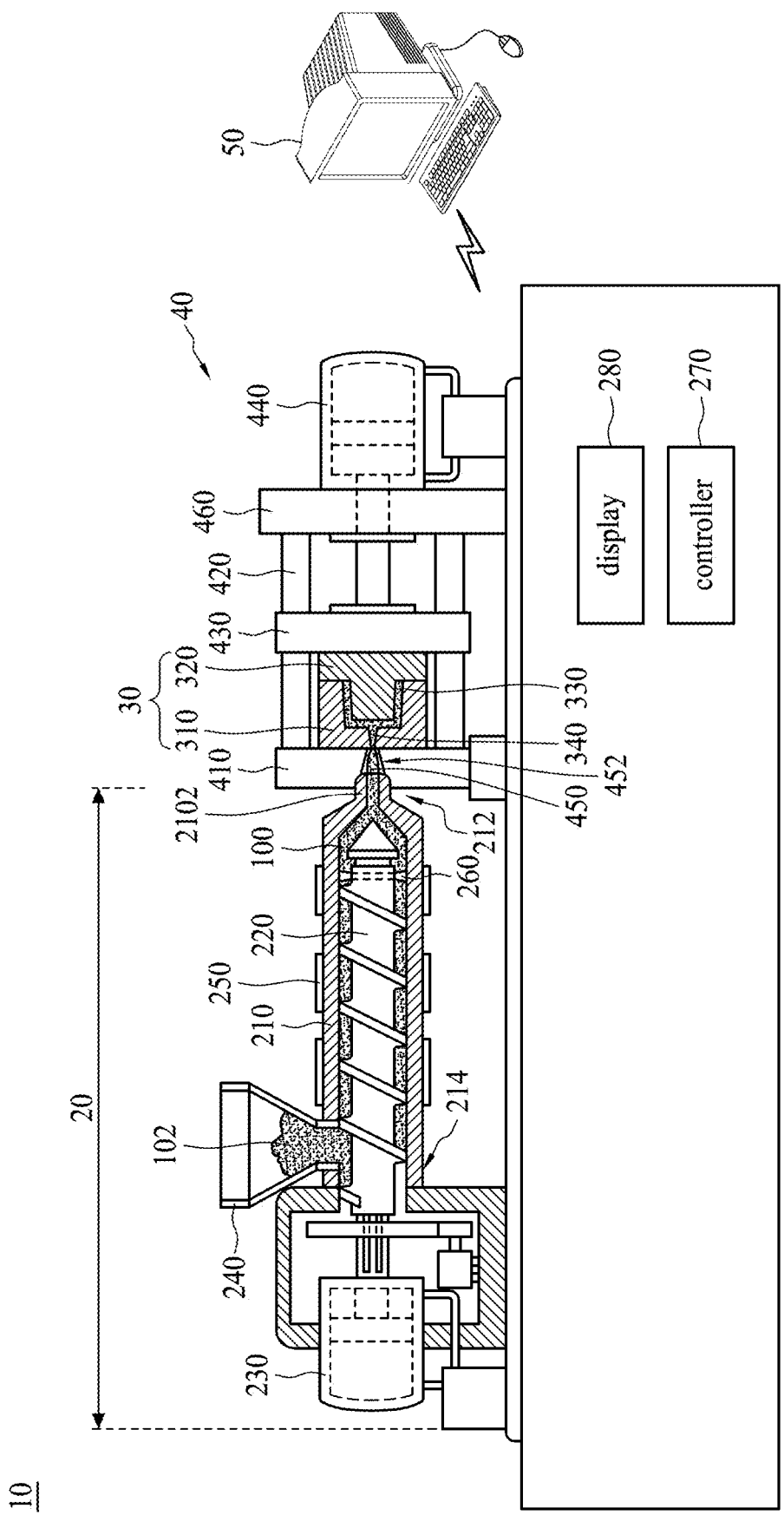
FIG. 8 is a schematic view of an injection-molding apparatus 10 in accordance with some embodiments of the present disclosure.

FIG. 8 is a schematic view of an injection-molding apparatus 10 in accordance with some embodiments of the present disclosure. Referring to FIG. 8, the injection-molding apparatus 10 that can be used to carry out molding includes a molding machine 20, a mold 30, a clamping assembly 40 and a computer 50. The molding machine 20 includes a barrel 210 having a downstream end 212 connected to the mold 30. The mold 30 includes mold halves 310 and 320 to define a mold cavity 330 and a runner 340 in communication with the mold cavity 330.

The clamping assembly 40 is in operative connection with the mold 30 for clamping the mold halves 310 and 320. In some embodiments, the clamping assembly 40 includes a fixed plate 410, a plurality of tie bars 420 mounted on the fixed plate 410, and a moving plate 430 slidably engaged with the tie bars 420 and guided by a is driving cylinder 440. The mold half 310 proximal to the barrel 210 is secured on the fixed plate 410, and the mold half 320 distal to the barrel 210 is secured on the moving plate 430 in any suitable manner, wherein the driving cylinder 440 drives the moving plate 430 to open or close the mold 30. In some embodiments, the barrel 210 includes a nozzle 2102 adapted to engage a sprue 450 in the fixed plate 410. In some embodiments, the sprue 450 is in communication with the runner 340 as the mold half 310 is assembled with the fixed plate 410. In some embodiments, the fixed plate 410 may be equipped with a sprue bush 452 including the sprue 450 and receiving the nozzle 2102 during an injection time. A molding material 100 under pressure is delivered to the sprue bush 452 from the nozzle 2102 pressed tightly against the sprue bush 452 in order to deliver the molding material 100 to the sprue 450 during a filling stage of the injection time.

In some embodiments, the clamping assembly 40 further includes an ejector plate 460 mounted with at least one ejector pin (not shown), wherein the moving plate 430 is disposed between the fixed plate 410 and the ejector plate 460. In some embodiments, the ejector plate 460 is fixed on the tie bar 420. In some embodiments, the driving cylinder 440 penetrates the ejector plate 460 and directly connects to the moving plate 430 to open or close the mold 30. After the mold halves 310 and 320 are separated (i.e., the mold 30 is opened), a distance between the moving plate 430 and the ejector plate 460 is reduced, so the ejector pin can penetrate through the ejector plate 460 to push a molded product out of the mold 30.

A screw 220 is mounted for moving within the barrel and is operably connected, at an upstream end 214 opposite to the downstream end 212 of the barrel 210, to a driving motor 230. The is molding machine 20 processes material, such as plastic granules 102, by feeding the material through a hopper 240 to the barrel 210 in order to make the material soft and force the molding material 100 into the mold 30 by the use of the screw 220, wherein the plastic granules 102 change phase from solid to liquid by at least one heater band 250 surrounding the barrel 210. In some embodiments, the molding machine 20 further includes a check valve 260 mounted on the screw 220, wherein the check valve 260 is in tight contact with the barrel 210 during the filling stage, and the check valve 260 is open for allowing the liquid material to flow to the downstream end 212 of the barrel 210 during a packing stage. In some embodiments, if the mold cavity 330 is almost filled with the molding material 100, a packing process proceeds. In some embodiments, the screw 220 rotates and moves toward the upstream end 214 of the barrel 210 during the packing stage.

The molding machine 110 further includes a controller 270 for controlling and monitoring the real-time functions of the molding machine 20, and a display 280 for displaying data related to the performance and operation of the molding machine 20 to on-site technicians. In some embodiments, the display 280 is further configured to accept input data from the on-site technicians. In other words, the display 280 is provided with a communications link directly with the controller 270 to provide real-time control of the molding to machine 20 by the on-site technicians particularly where the on-site technicians' intervention is required.

In some embodiments, the molding machine 20 can further include operation interface communication links among the controller 270, the display 280 and peripheral devices, and a program sequence of operation which allows the operation interface to monitor diagnostic functions of the controller 270 and the molding machine 20, trigger sound and/or light alarms regarding conditions of the molding machine 20, receive performance data from the molding machine 20, and receive input data from the display 280.

The computer 50 is associated with the molding machine 20 and is configured to execute CAE simulation software and transmit at least one simulation result to the controller 270 through a connection such as a hard wire connection or a wireless coupling. In some embodiments, the computer 50 includes a standardized operation system capable of running general-purpose application software for assisting with the analysis of process performance data and for communicating with the controller 270 and the display 280 via communication ports of each.

Figure 9:
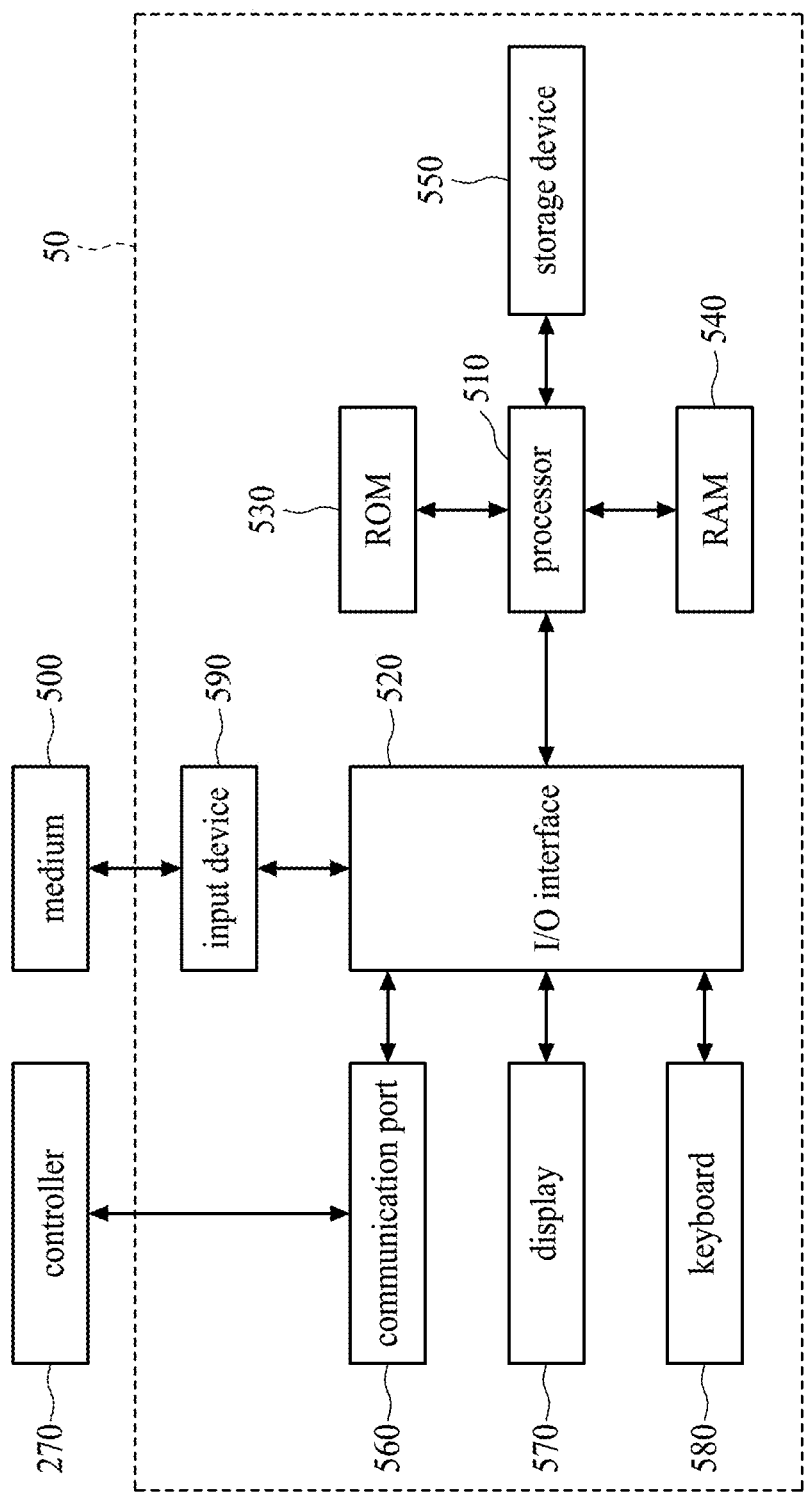
FIG. 9 is a functional block diagram of the computer in FIG. 8.

FIG. 9 is a functional block diagram of the computer 50 in FIG. 8. Referring to FIG. 9, the computer 50 includes a processing module 510 such as a processor adapted to perform a computer-implemented simulation method for use in injection molding, an input/output (I/O) interface 520 electrically coupled to the processing module 510, and memories, which may include a read-only memory (ROM) 530, a random access memory (RAM) 540 and a storage device 550. The ROM 530, the RAM 540 and the storage device 550 are to communicatively coupled to the processing module 510.

The computer 50 further includes a communication port 560 associated with the controller 270 of the molding machine 20. The computer 50 may further include one or more accompanying input/output devices including a display 570, a keyboard 580 and one or more other input devices 590. The input devices 590 may include a card reader, an optical disk drive or any other device that allows the computer 50 to receive input from the on-site technicians. In some embodiments, the input devices 590 are configured to input computer instructions (software algorithms) stored in a non-transitory computer-readable medium 500, and the processing module 510 is configured to execute operations for performing a computer-implemented injection-molding simulation method according to the computer instructions. In some embodiments, the processing module 510 reads software algorithms from the other input device 590 or the storage device 550, executes the calculation steps, and stores the calculated result in the RAM 540.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, and steps.

What is claimed is:

1. A molding system for preparing an injection-molded fiberless plastic article, comprising:
    a molding machine;
    a mold disposed on the molding machine and having a mold cavity for being filled with a fiberless molding resin including a plurality of polymer chains;
    a processing module configured to generate an anisotropic viscosity distribution of the fiberless molding resin in the mold cavity based on a molding condition for the molding machine; wherein the anisotropic viscosity distribution of the fiberless molding resin is generated based in part on consideration of an orientation effect of the plurality of polymer chains; and
    a controller coupled to the processing module and configured to control the molding machine with the molding condition using the generated anisotropic viscosity distribution of the fiberless molding resin to perform an actual molding process for preparing the injection-molded fiberless plastic article;
    wherein the fiberless molding resin includes polycarbonate resin.

2. The molding system of claim 1, wherein the orientation effect of the plurality of polymer chains is represented by an expression:

$$R_{TR} = \frac{\eta_E}{\eta_S} = \frac{R_{T0}}{1+\left(\frac{\dot{\gamma}}{\dot{\gamma}_c}\right)^2}$$

where $\eta_E(\dot{\gamma})$ represents the elongational viscosity of the fiberless molding resin, $\eta_S(\dot{\gamma})$ represents the shear viscosity of the fiberless molding resin, $R_{T0}$ represents a constant, $\dot{\gamma}_c$ represents a critical strain rate, and $\dot{\gamma}$ represents a strain rate of the fiberless molding resin.

3. The molding system of claim 1, wherein the processing module is further configured to generate an anisotropic stress distribution of the fiberless molding resin based in part on consideration of the generated anisotropic viscosity distribution of the fiberless molding resin.

4. The molding system of claim 3, wherein the anisotropic stress distribution of the fiberless molding resin is represented by an expression:

$$\tau = 2\eta^{IISO} D$$

$$\eta^{IISO} = \eta_S \left[ 1 + (R_{TR} - 3) \frac{\dot{\gamma}_f^2}{\dot{\gamma}^2} \right]$$

$$\frac{\dot{\gamma}_f^2}{\dot{\gamma}^2} = \frac{D:A_4:D}{2D:D}$$

where $\tau$ represents a stress tensor, $\eta^{IISO}$ represents an informed isotropic viscosity, D represents a rate of deformation of the fiberless molding resin, $A_4$ represents an orientation distribution of the plurality of polymer chains, $\dot{\gamma}_f$ represents a micro strain rate due to an orientation effect of the fiberless molding resin, and $\dot{\gamma}$ represents a strain rate of the fiberless molding resin.

5. The molding system of claim 1, wherein the processing module is further configured to generate the anisotropic stress distribution of the composite molding material based in part on consideration of an anisotropic rotational diffusion effect of the plurality of polymer chains.

6. The molding system of claim 5, wherein the rotational diffusion effect of the plurality of polymer chains is represented by an expression:

$$D_R = D:A_4:D$$

where $D_R$ represents the anisotropic rotational diffusion effect of the plurality of polymer chains, D represents a rate of deformation of the molding material, and $A_4$ represents an orientation distribution of the plurality of polymer chains.

7. The molding system of claim 1, wherein the processing module is further configured to generate the anisotropic stress distribution of the composite molding material based in part on consideration of an anisotropic degree of the plurality of polymer chains.

8. The molding system of claim 1, wherein the anisotropic degree of the plurality of polymer chains is represented by a ratio of a shear rate of the polymer chains to a shear rate of the fiberless molding resin.

9. The molding system of claim 8, wherein the anisotropic degree of the plurality of polymer chains is represented by an expression:

$$\frac{\dot{\gamma}_f^2}{\dot{\gamma}^2} = \frac{D:A_4:D}{2D:D}$$

where $\dot{\gamma}_f$ represents a micro strain rate due to an orientation effect of the fiberless molding resin, $\dot{\gamma}$ represents a strain rate of the fiberless molding resin, D represents a rate of deformation of the fiberless molding resin, and $A_4$ represents an orientation distribution of the plurality of polymer chains.

10. The molding system of claim 1, wherein the processing module is configured to generate the anisotropic stress distribution of the fiberless molding resin based on an expression:

$$\tau' = 2\eta'D + 2\eta'N_P(\dot{\gamma})\left(\frac{D:A_4:D}{D:D}\right)D$$

where $\tau'$ represents the anisotropic stress distribution of the molding material, $\eta'$ represents a shear viscosity distribution of the fiberless molding resin, D represents a rate of deformation of the molding material, $N_P(\dot{\gamma})$ represents the integral effect, and $A_4$ represents an orientation distribution of the polymer chains.

* * * * *